Nov. 5, 1940.　　　　　E. A. DERUNGS　　　　　2,220,813
ELECTROMAGNETIC REMOTE CONTROL DEVICE
Filed Aug. 11, 1939　　　3 Sheets-Sheet 1
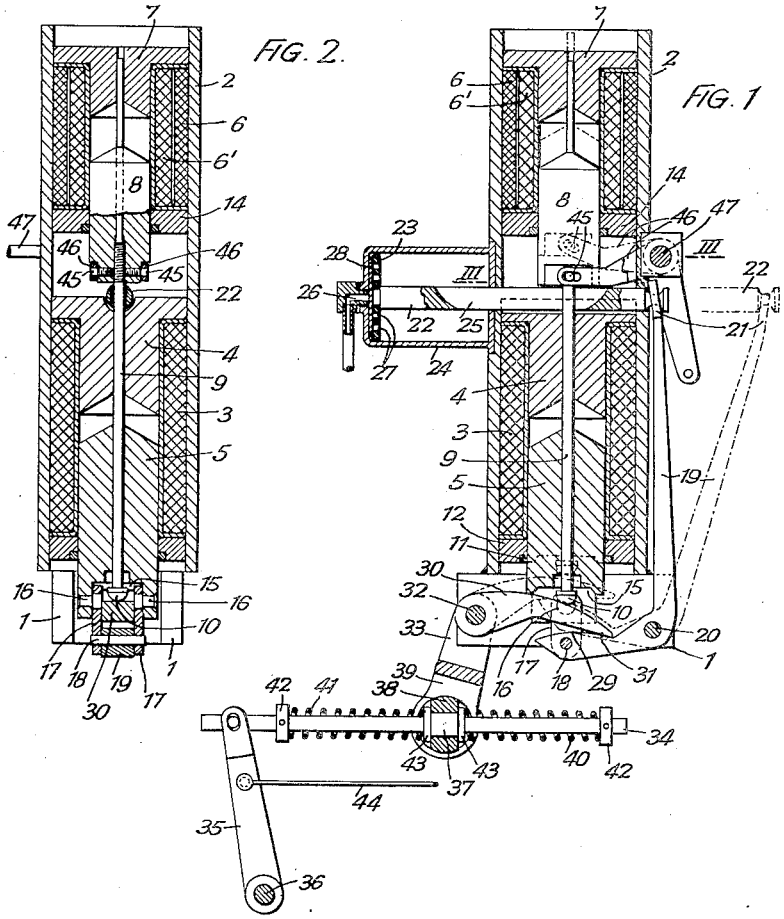
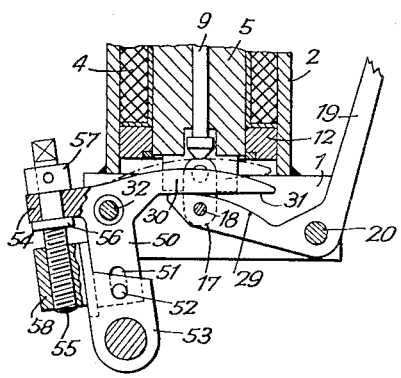
Inventor:
Ernest A. Derungs
By Sommers & Young
Attys

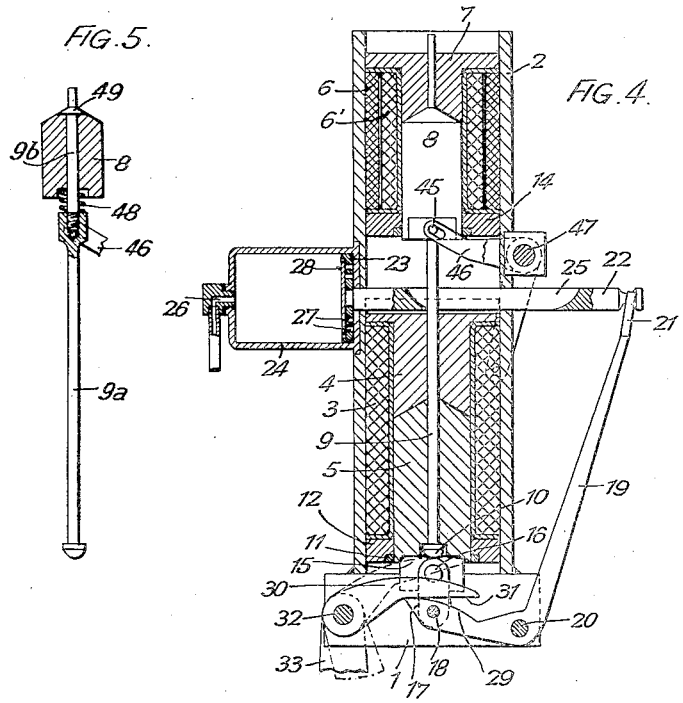
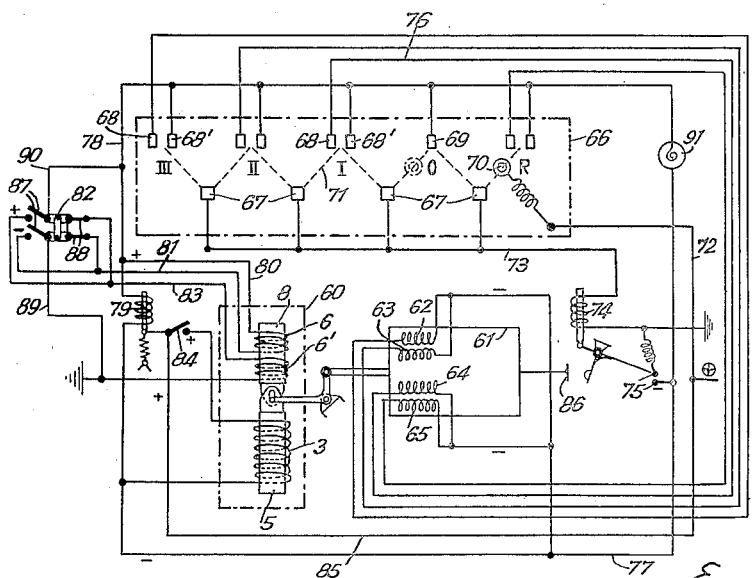

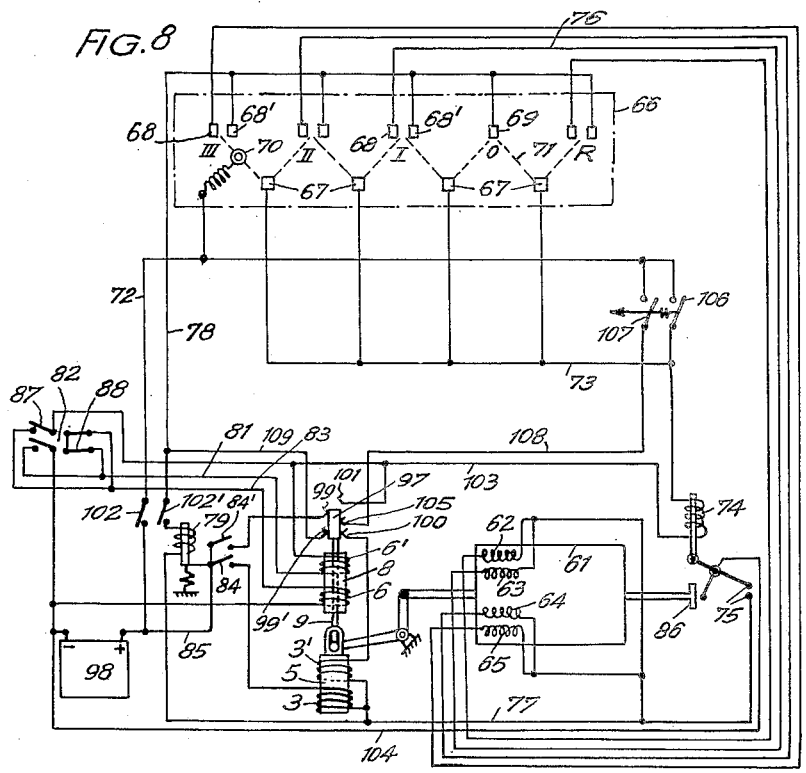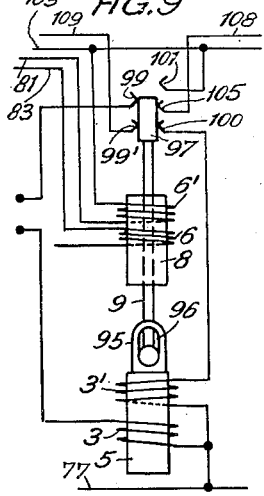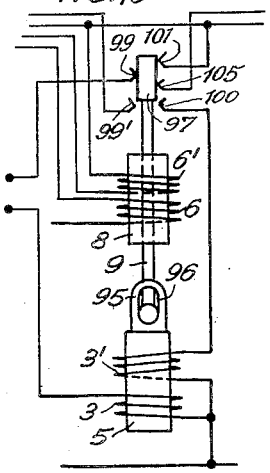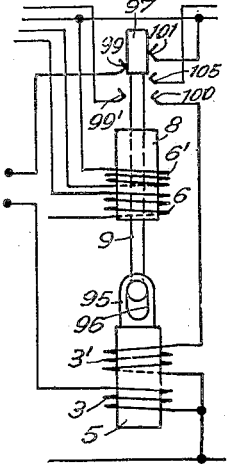

Patented Nov. 5, 1940

2,220,813

UNITED STATES PATENT OFFICE 2,220,813

ELECTROMAGNETIC REMOTE CONTROL DEVICE

Ernest Alphonse Derungs, Neuilly-sur-Seine, France

Application August 11, 1939, Serial No. 289,709
In Switzerland August 18, 1938

15 Claims. (Cl. 175—335)

This invention relates to electromagnetic control devices.

In the devices employed for the remote control of members of machines it is frequently necessary to be able to control with an absolute certainty two successive movements by means of a single operation and to afterwards ensure the return to the original positions which preceded the said operation, within a time depending of the characteristics and of the operation of the machine.

Particularly the case is occurring for the changes of speed combined with a release of the clutch, as for instance in change speed gears, when changing a reduction ratio between a driven machine and its motor, which change is accompanied by a release of the clutch.

The object of the present invention is to create an electromagnetic control device ensuring on the one hand exactly the required efforts for such operations in the strictly fixed order for the succession of the movements, and on the other hand the return to normal operating conditions of the machine in a predetermined time which can be made adjustable.

According to the present invention the control device comprises at least two electromagnets, principal and secondary, having armatures formed by movable plunger cores the attraction strokes of which are unequal and which are coupled with each other so as to be capable of moving together and relatively one with respect to the other, and so that when the electromagnets are excited, the principal core drives the secondary core until the end of its own stroke, and then the secondary core alone continues its movement of attraction.

Preferably two electromagnets having their plunger cores coupled together, are mounted in a same cylindrical body, their movable cores being connected by a central rod which is disposed in such manner that the core of the principal magnet drives the core of the secondary magnet until the end of its proper stroke and then the core of the secondary magnet is abandoned to itself until the end of its stroke, the connections of the two cores being such that when excitation of the core of the secondary magnet is maintained and this core is held in its attracted position, it also maintains the core of the principal magnet in the attracted position, even when the coil of this latter magnet has been deenergized.

The accompanying drawings show by way of example a preferred form of embodiment of the invention and a modification thereof.

Fig. 1 is an axial section of a control device with two electromagnets;

Fig. 2 is a partial axial section in a plane displaced at 90° with respect to the plane of section of Fig. 1;

Fig. 3 is a section according to the line III—III of Fig. 1;

Fig. 4 is a section corresponding to that of Fig. 1, but representing the device in another position of operation;

Figs. 5 and 6 show modifications of parts of the device;

Fig. 7 is a diagram of the electrical connections of an electromagnetically operated change speed gear in which the control device according to the invention is used;

Fig. 8 is a similar diagram for an electromagnetically operated change speed gear making use of a modified control device;

Figs. 9, 10 and 11 show diagrammatically the modified control device in three different operating positions.

The control device represented in Figs. 1 to 6 is destined to the control of a change speed gear of a motor vehicle and of its clutch. It comprises two supporting plates 1 carried by the chassis of the vehicle and on which is fixed by welding or otherwise a cylindrical body enclosing two electromagnets disposed in axial alignment. The lower or principal electromagnet comprises a winding 3, a fixed core 4 and a movable plunger core or armature 5. The upper or secondary electromagnet comprises two windings 6 and 6', disposed one within the other, a fixed core 7 and a movable plunger core or armature 8. The two movable cores have unequal strokes and are disposed around a central rod 9 freely traversing the fixed cores 4 and 7 and the movable core 5, and being screwed into the movable core 8. The lower end of the rod 9 carries a head 10 on which bears the core 5 when the secondary core 8 is at the end of its attracting stroke (Fig. 4). The centering of the movable core 5 is obtained, on the one hand, by a small steel ring 11 fixed in a supporting ring 12 and, on the other hand, by the guiding of the rod 9 in the fixed core 4, and the centering of the movable core 8 is ensured by the portion of the rod 9 traversing the fixed core 7. The rod 9 is preferably made of an antimagnetic metal, so as not to influence the magnetic field of the windings of the electromagnets, which could disturb the correct operation of the plunger cores.

The exterior end of the movable core 5 is provided with a transverse cavity 15. In the two lateral cheeks of this cavity are riveted journals 16 carrying two small connecting rods 17 which support an axis 18, on which is articulated one of the ends of a lever 19. This latter is pivoted on an axis 20 which is carried by the supporting plates 1, and its other end forms a fork 21 engaging one end of a rod 22 the other end of which carrying a piston 23 which can move in a closed cylinder 24. The rod 22 is provided with a longitudinal slot 25 through which passes the central rod 9 interconnecting the two movable cores.

The front end of the cylinder 24 is provided with an opening 26 of small diameter communicating with the atmosphere and the cross sectional area of which may be varied by adjusting means not shown. The piston 23 can be provided with small holes 27 and carry a valve disk 28 having a small play in the direction of movement of the piston, so that when the piston moves towards the opening 26 in Fig. 4, the disk 28 closes the holes 27, and when it moves in opposite direction the holes 27, open and establish a communication between the two sides of the cylinder, separated by the piston.

The lever 19 is provided with a curved cam surface 29 on which bears a lever 30 with a plane cam surface 31, this lever being mounted on an axis 32 carried by the supporting plates 1. On this axis 32 there is fixed another lever 33 which is connected to a rod 34 capable of actuating a third lever 35 rigid with a shaft 36 which controls the usual clutch disposed between the motor of the vehicle and the change speed gear. The rod 34 is provided with a journal 37 on which is mounted a cylindrical slide 38 the two ends of which are introduced in the circular opening of a fork 39 of the lever 33. Two springs 40 and 41 are interposed, at each side of the slide 38, between two adjustable stops 42 rigid with the rod, and two washers 43, loose on the rod and bearing against the slide. A cable 44 is attached to the lever 35 and is connected to a control pedal not shown, and which can serve for the mechanical control of the clutch and of the change speed gear, if the electromagnetic control, for any reason, does not operate or if it is not desired to use it.

To the lower part of the movable core 8 are screwed two journal screws 45 on which are articulated two levers 46 fixed on the other hand on a shaft 47 which transmits the movement imparted to it by the attraction of the core 8 to a not represented selector actuating the change speed gear. A portion of the length of this shaft 47 is of relatively weak cross section, in order to be capable of an elastic deformation by torsion, sufficient to absorb reactions which may be encountered in the transmission of the movement of the core, if for example a jamming is produced in the change speed gear.

The operation of the described device is as follows: Upon excitation of the electromagnets which, in the case of the application of the device to a motor vehicle, are preferably simultaneously excited, the two movable cores are attracted towards their fixed cores. The lower electromagnet being more powerful, the core 5 is attracted with the greater force and it drives the core 8 by the intermediary of the small connecting rods 17, of the cam lever 19 acting on the cam lever 30, and of the rod 9 the head 10 of which is resting on the back of the lever 30. When the core 5 has arrived at the end of its attracting stroke, the core 8 has moved through about two thirds of its proper stroke; this core as well as the levers 19 and 30 occupying then the positions indicated in dash and dot lines in Fig. 1. The lever 19 has displaced the piston 23 towards the right end of the cylinder 24, and the lever 30, by the intermediary of the lever 33 of the slide 38, of the rod 34 and of the lever 35, has produced the release of the clutch.

It is seen that owing to the two cam surfaces 29 and 31, rolling one on the other, the lever 19 acts first with a small lever arm on a great arm of the lever 30, and that, while the attracting movement of the core 5 proceeds, the ratio of transmission changes, the lever arm with which acts the lever 19 increases, while the length of the driven lever arm 30 decreases. The torque transmitted by the levers 19 and 30 during the attracting movement of the core 5 accordingly decreases, but the force of attraction acting on the movable core 5 rapidly increases when this core approaches the fixed core. By means of a judicious determination of the cam surfaces 29 and 31, and of the spacing of the axes of the levers 19 and 30, combined with a very high magnetic saturation of the electromagnet, it is possible to obtain that the torque transmitted by the two levers 19 and 30 remains sensibly constant from the beginning until towards the end of the attractive movement of the movable core 5, and that the torque is perfectly adapted to the resistance to be overcome for releasing the clutch. The transmission device formed by the two cam levers therefore constitutes a device for varying the speed and the torque. The magnetic saturation of the electromagnets can be such that the forces of attraction at the beginning and at the end of the attractive movement of the movable core have a ratio of the order of magnitude of 1/10.

During this movement of attraction the piston 23 has been moved towards the right into the position indicated in Fig. 4. When this piston is provided with holes 27 as in the represented example, the movement of the piston has no effect on the transmission of movement by the levers 19 and 30. However, when the holes are very small or no holes at all are provided, it is possible to adjust the opening 26 to the atmosphere in such manner that the air can enter the cylinder 24 only with a certain lag with respect to the movement of the piston, so that a partial vacuum is formed on the left side of the piston, this vacuum acting as brake for the movement of the piston, and accordingly also for the transmission of the movement to the members 35 and 47 controlling the release of the clutch and the change of speeds.

When the core 5 arrives at the end of its stroke, it abuts against the fixed core 4, and the upper core 8 alone continues its movement of attraction, together with the rod 9 until the end of its proper stroke. The movement of the core 8 is transmitted by the intermediary of the levers 46 to the shaft 47 connected to the control member of the change speed gear, which member may be constituted for example by a selector such as described in the copending application Ser. No. 131,719. During the first period of the movement of attraction of the core 8, when it moves together with the core 5, the shaft 47 simply produces a movement of the selector without this latter having a function to perform, while waiting that the release of the clutch be made. This release is obtained when the core 5 has arrived at the end of its stroke; then the core 8 alone continues to advance and further rotation of the shaft 47 moves the selector to produce the desired change of gears in the change speed box of the vehicle.

As soon as this change is effected, the circuits of the two electromagnets are cut, in a manner which will be described later, and the two movable cores can return to their positions of rest under the action of the springs of the clutch and eventually under the action of springs which the selector may possess. The device for varying the speed and the couple, formed by the two levers 19 and 30, acts now in reverse direction. Under the action of the springs of the clutch, the lever 30 is brought from the position indicated in dotted lines in Fig. 1 to the position in full lines, and thus restores the lever 19 and the piston 23 to their positions of rest as indicated in full lines. The lever 30 first acts with a small lever arm on a great lever arm of the lever 19 and, owing to the rolling of the cam surface 31 along the cam surface 29, the length of the lever arm 30 increases and that of the lever arm 19 decreases. The same angle of movement of the lever 30 causes therefore a steadily growing angle of movement of the lever 19 and the speed of the piston 23 returning from its position of Fig. 4 to that of Fig. 1, tends to increase. But the opening 26 of the cylinder 24 is adjusted so that the air can only slowly escape, and the piston, while advancing, compresses the air in the cylinder which acts as brake of the movement of the piston; the more the piston tends to increase its speed, that is to say towards the end of the return movement of the cores, the more the braking becomes effective. This return movement corresponds to engagement of the clutch, and the manner of braking obtained in the cylinder 24 is precisely adapted to the engaging movement. In the beginning of the movement the braking is little effective and towards the end of the movement, when the friction disks of the clutch begin to enter in contact, the braking is increased and secures a soft engagement without shocks.

The stroke of attraction of the movable core 5, producing the disengagement of the clutch, is effected against the action of the springs of the clutch which are compressed during this stroke of attraction. The force of attraction acting on the core 5 must naturally overcome the resistance of the springs of the clutch until the disengagement is effected. Once the disengagement is made, the resistance of these springs could become too great and prevent the movable core 5 from arriving at the end of its attractive stroke. In order to avoid this, the spring rod 34 and the springs 40 and 41 provide a yielding connection between the cam lever 30 and the lever 35 controlling the clutch. When the resistance of the springs of the clutch passes beyond a certain value, the lever 35 and the rod 34 remain stationary and the slide 38 moves alone against the action of the spring 40 until the movable core 5 arrives at the end of the stroke. The spring 40 constitutes therefore a limiting device of the couple of disengagement.

If the electric current would fail, or if, for another reason, the driver of the vehicle does not desire to make use of the electromagnetic control, he can effect the disengagement and the change of speed by means of a pedal exerting a traction on the cable 44. The lever 35 moves and produces the disengagement by turning the shaft 36. At the same time the lever acts on the rod 34 which moves the slide 38, the lever 33 and the cam lever 30. This latter, by the intermediary of the rod 9, moves the core 8, as well as the core 5 as soon as the head 10 of the rod, bearing on the back of the cam lever 30, abuts against the bottom of the cavity 15 of this core. It had been seen that during the electromagnetic control, the cam lever 30 arrived in the position indicated in full lines in Fig. 4 in which the plane cam surface 31 is approximately perpendicular to the axis of the electromagnets. Since, during the control by the cable 44, it is the cam lever 30 which must drive the movable core 8 to the end of its stroke, in order that this latter completely actuates the shaft 47 moving the selector of the change speed gear, this lever 30 must be moved further than when the cores are attracted by energization of the electromagnets; the lever 30 is moved by the lever 33 to the position indicated in dash and dot lines in Fig. 4, in which it has pushed the rod 9 until the head 10 abuts against the core 5. The lever 35 controlling the disengagement must therefore move through a greater angle when it is actuated by the cable 44 than when it is controlled by the movable core 5.

In order not to prevent that the lever 35 may continue to turn under the action of the cable 44, even when the lever has arrived at the end of its stroke, the rod 34 carries the second spring 41. When the lever 30 cannot move further and the slide 38 is blocked, the lever 35 and the rod 34 move alone while compressing the spring 41. This spring limits the effort exerted by the cable 44 on the members which produce the passage of the speeds, and when, by any reason whatever, a speed could not pass and the movable core 8 not advance till the end of its stroke, and the slide would be blocked, the action of the cable 44 can continue just the same by simply compressing the spring 41.

Fig. 5 shows a modification of the manner of coupling the two movable cores 5 and 8. The coupling rod of the two cores is made of two parts 9a and 9b screwed one into the other. The part 9b freely traverses the core 8, and a spring 48, disposed between the bottom of the core 8 and the part 9a of the rod, constantly tends to apply the core 8 against a stop 49 at the upper end of the part 9b. When for any reason whatever a passage of a speed cannot be made and the core 8 could not move until the end of its stroke, the core 5 could advance just the same for effecting the disengagement, while compressing the spring 48.

In the modification of Fig. 6 the lever 30 having the plane cam surface 31 is provided with an arm 50 having a slot 51 in which is engaged the pin 52 of an attached piece 53 capable of sliding along the arm 50. An extension 54 of the lever 30 is traversed by a screw 55 capable of turning in the extension but which is prevented from moving axially with respect to the extension, by means of two collars 56 and 57. This screw 55 screws into a nut 58 formed on the movable piece 53. By screwing or unscrewing the screw 55 by means of a manipulating wrench, the piece 53 slides with respect to the arm 50, whereby the arm is made longer or shorter. This device thus serves to vary the ratio of transmission between the cam lever 30 and the clutch and permits adaptation of the transmitted couple to the resistances to be overcome while disengaging the clutch, or to vary the stroke of the disengaging member with respect to the stroke of the core 5.

Fig. 7 shows a diagram of the electrical connections of a complete electromagnetic control device for the clutch and the change speed gear of a motor vehicle. The described electromagnetic device is indicated at 60 with its two movable cores 5 and 8, the latter being coupled to the selector 61 which controls the different speeds of a change speed gear, and which comprises four electromagnets 62, 63, 64 and 65 each of which controls a member capable of effecting a change of speed when it has been placed in an active position by the excitation of its electromagnet and when the device 60, after having been excited, moves the selector 61. The control of the electrical circuits is obtained by means of a commutator 66. This commutator comprises a group of four contacts 67, a group of four double contacts 68 and 68', which correspond to the three forwards speeds I, II and III, and to the reverse speed R, and a simple contact 69 corresponding to the neutral position of the change speed gear. These contacts can be connected in circuit by a movable contact 70 carried by the operating member of the commutator and capable of moving along the zig-zag line 71. In the position of rest, this movable contact is between two groups of contacts as represented and does not establish any circuit.

Supposing that the change speed gear is in neutral position and that it is desired to switch in the first speed. The movable contact 70 is then between the contact 69 and the contact 67 as represented in dotted lines in the diagram. This movable contact is then moved towards the left on the contact 67. The following circuit is then established: Positive pole, conductor 72, movable contact 70, contact 67, conductor 73, relay 74, ground. The excitation of the relay 74 produces the closure of the two contacts 75. The movement of the movable contact 70 continues and it arrives now on the two contacts 68 and 68' corresponding to the position I. Then the following circuits are established:

(a) Positive pole, conductor 72, movable contact 70, contact 68, conductor 76, electromagnet 64, conductor 77, contacts 75, ground;

(b) Positive pole, movable contact 70, contact 68', conductor 78, relay 79, conductor 77, contacts 75, ground;

(c) Contact 68', conductor 78, conductor 80, winding 6 of the secondary core 8, conductor 81, auxiliary commutator 82, conductor 83, winding 6' of the core 8, ground.

The excitation of the relay 79 has caused the closure of the two contacts 84 whereby the following circuit is established: Positive pole, conductor 85, contacts 84, winding 3 of the principal core 5, conductor 77, contacts 75, ground. The three windings 3, 6 and 6' of the electromagnetic device 60 and one of the electromagnets of the selector 61 have been simultaneously excited at the moment where the relay 74, by the closure of the contact 75, has established the connection to the ground of the respective circuits. The movable cores 5 and 8 of the electromagnetic device are attracted, and as it had been described above, the core 5 produces the release of the clutch and starts the movement of the selector 61, eventually until the wheels corresponding to the desired speed begin their mutual engagement, then the core 5 has arrived at the end of its stroke and the core 8 alone continues its movement and finishes the engagement of the wheels.

When the selector 61 has arrived at the end of its stroke, it bears by its abutment 86 against that one of the contacts 75 which had been moved by the relay 74 and produces the separation of the two contacts 75 whereby the circuits of the relay 79 and accordingly of the winding 3 and of the electromagnet 64 of the selector are opened. When the driver of the vehicle now releases the movable contact 70 of the commutator, this contact returns in one of its intermediary positions and the connection of the contacts 68 and 68' with the positive pole of the source of current is cut. The current of the windings 6 and 6' is also cut and the two movable cores 5 and 8 return to their positions of rest, the selector 61 also returns to its position of rest and the clutch engages. When, however, the driver of the vehicle, instead of letting go the movable contact 70 of the selector, continues to urge it against the two contacts 68 and 68', the circuit of the winding 3 of the principal core 5 is indeed cut, but the circuits of the windings 6 and 6' of the secondary core 8 are maintained, because their connection to the ground has not been cut. In this case the core 8 remains in its attracted position and also maintains the core 5 in its position of attraction. The engagement of the clutch does accordingly not occur until the driver releases the movable contact 70 of the commutator.

When the driver moves the movable contact 70 from an intermediary position directly on two contacts 68 and 68', without passing first over one of the contacts 67, the relay 74 is not excited and the circuits of the winding 3 and of the electromagnet of the selector 61 corresponding to the position of the movable contact are not closed. However, the windings 6 and 6' of the core 8 are excited because they are directly connected to the ground. But this excitation has no effect on the cores 5 and 8, as the current passing through these windings is too feeble to produce an attraction of the cores. The two windings 6 and 6' can only maintain or extend the state of attraction of the two cores when these latter have previously been brought into their positions of attraction by the simultaneous excitation of the windings 3 and 6, 6', but they alone cannot move the cores out of their position of rest.

The two windings 6 and 6' can be connected in series or in parallel for the purpose of varying the effect of attraction acting on the core 8 according to the needs. The change of connection of the two windings is effected by means of the auxiliary commutator 82 which comprises two pairs of contacts 87 and 88 capable of being connected alternately to the conductors 81 and 83. The contacts 88 are connected between themselves, while one of the contacts 87 is connected to the contacts 68' and the other to the ground. In the represented position the current passes from a contact 68' through the conductor 80 to the winding 6, and through the conductor 81, the contacts 88, the conductor 83, to the winding 6' which is connected to the ground. The windings are therefore connected in series. In the second position of the commutator 82 the circuit is cut at the contacts 88 and closed at the contacts 87. The current passes now from the contact 68', on the one hand through the conductor 80 to the winding 6 and through the conductor 81 the contact 87 and the conductor 89 to the ground, and, on the other hand, through the conductor 90, the contact 87, the conductor 83 to the winding 6' and from there to the ground. In this case, the two windings are connected in parallel.

A control lamp 91 is lighted each time the movable contact 70 passes on two contacts 68 and 68' and indicates the passage of the speed corresponding to the position of the movable contact.

In the modification of the control device as shown in Figs. 8 to 11 the two cores 5 and 8 are coupled in the same manner as in Figs. 1 to 4, so as to be capable of moving together and relatively one with respect to the other. The core 5 of the principal electromagnet is supposed to be connected, as described before, to the clutch of the motor vehicle, and the core 8 of the secondary electromagnet is connected to the selector 61, by the intermediary of which are effected the changes of speed. For the reason of simplicity, the core 5 is represented as being rigid with an extension 95 provided with a slot 96, into which penetrates the lower end of the rod 9 which is rigid with the core 8 and carries at its upper end a contact piece 97. To each core 3 and 5 correspond two windings 3, 3' and 6, 6' respectively, capable of being connected to a source of current or a battery 98. The contact piece 97 cooperates with five fixed contacts 99, 99', 100, 101 and 105 so as to connect either the contacts 99 and 99' with the contacts 100 and 105, or the contact 99 with the contact 101, but the length of the contact piece 97 is slightly less than the spacing of the two contacts 100 and 101, so that these two contacts cannot be connected together.

The selector 61 comprises again four windings 62, 63, 64 and 65 each of which controls a member capable of effecting a change of speed when it has been placed in an active position by the excitation of its winding, and when the excited core 8 moves the selector 61. The control of the electrical circuits of the electromagnetic device with the cores 5 and 8, and of the selector 61, is obtained by means of a commutator 66 which is identical to that described with respect to Fig. 7. The movable contact 70 of this commutator is connected by the intermediary of the conductor 72 and of a manually operated switch 102 placed on the dash board of the vehicle, to the positive pole of the battery 98. This commutator comprises a group of four contact pieces 67, a group of four double contact pieces 68 and 68' corresponding to the three forward speeds I, II, III and to the reverse speed R, and a simple contact piece 69 corresponding to the neutral position of the change speed gears. The movable contact 70 can move along the zig-zag line 71 so as to pass alternatively from a contact piece corresponding to a speed, to a contact piece 67.

Supposing that the change speed gear is in the neutral position and that it is desired to engage the first speed. The movable contact 70 is then moved from the contact piece 69 along the line 71 to the adjacent contact piece 67 and from there to the double contact piece 68, 68' corresponding to the first speed. Before effecting this control the two switches 102 and 102' have been closed. When the movable contact 70 arrives on the contact piece 67, the following circuit is established: Positive pole of the battery 98, conductor 72, contact 70, contact piece 67, conductor 73, relay 74, conductor 103, winding 6', conductor 81, switch 88 of the auxiliary commutator 82, conductor 83, winding 6, negative pole of the battery 98. This circuit produces the excitation of the relay 74 which closes the contacts 75, but the current after having traversed the relay 74 is too feeble to attract the core 8. When the movement of the movable contact 70 is continued, the above cited circuit is interrupted, but the contacts 75 conserve their position of closure.

When the contact 70 arrives on the contact pieces 68 and 68' corresponding to the first speed, the following circuits are established:

(a) Positive pole of the battery 98, conductor 72, contact 70, contact piece 68', conductor 78, relay 79, conductor 72, contact 70, contact piece 68', conductor 78, relay 79, conductor 77, contacts 75, conductor 104, negative pole of the battery 98.

(b) Positive pole of the battery 98, conductor 72, contact 70, contact piece 68, conductor 76, winding 63, conductor 77, contacts 75, conductor 104, negative pole.

The circuit (a) excites the relay 79 which produces the closure of the switches 84 and 84', while the circuit (b) excites the winding 63 which produces the movement of a member effecting the engagement of the first speed of the change speed gear of the vehicle when the selector 61 has been moved.

The closure of the switches 84 and 84' establishes the following circuit: Positive pole, conductor 85, switches 84 and 84', and from there the current passes, on the one hand through the winding 3 and, on the other hand, to the contact 99, the piece 97, the contact 100 and the winding 3', to the conductor 77, and through the contact 75 and the conductor 104 to the negative pole. The two windings 3 and 3' of the core 5 are excited, and the attraction of the core 5 is effected with a considerable force producing the disengagement.

Before the excitation of the windings 3 and 3' of the core 5, the two cores 5 and 8 are in the position represented in Fig. 9. The contact piece 97, rigid with the rod 9 which is itself rigid with the secondary core 8, connects the contact 99 and 100, placing the winding 3' under tension but the contact 101 is not connected and the windings of the secondary core do not receive current.

At the end of the movement of attraction of the core 5 the movable cores of the electromagnetic device are in the position represented in Fig. 10. The rod 9 with the core 8 and the contact piece 97 have participated at the movement of the core 5 and at the end of this movement the contact piece 97 has abandoned the contact 100 and has entered into contact with the contact piece 101. During this first movement of the two cores, the selector, which is coupled with the rod 9 rigid with the core 8, has been moved but with an insufficient movement to produce the engagement of the gears corresponding to the first speed. From the end of the movement of attraction of the core 5 the winding 3' does not more receive current, but the winding 3 which is always fed through the switch 84, suffices to maintain the core 5 in its position of attraction and thus to conserve the disengagement. The contact 101, cooperating now with the contact piece 97 establishes the following circuit:

Positive pole of the battery 98, conductor 85, switches 84', contact 99, contact piece 97, contact 101, conductor 103, winding 6', conductor 81, switch 88 of the auxiliary commutator 82, conductor 83, winding 6, negative pole. The two windings 6 and 6' are excited and the core 8 moves along its path of attraction, the end of the rod 9 penetrating into the slot 96 moving from the lower end of this slot until its upper end, and the final position of the core 8 is represented in Fig. 11. This movement of the core 8 has produced a supplemental advance of the selector 61 and the gears corresponding to the first speed have been engaged.

When the selector 61 arrives at the end of its advance stroke an abutment 86 with which it is provided bears against a lever arm of that one of the contacts 75 which is controlled by the relay 74 and produces the separation of the two contacts 75. This separation results in the break of the circuit of the relay 79; the switch 84 opens and cuts the excitation circuits of the windings 3, 6 and 6', so that the two cores 5 and 8 return to their original positions; the selector 61 also returns to its position of rest and the motor is engaged, the vehicle now running in first speed.

It is seen that owing to the commutation device constituted by the movable contact piece 97 and the three fixed contacts 99, 100 and 101, the consumption of current is reduced with respect to that required in the device according to Figs. 1 to 4 for effecting the same operations, since as soon as the principal core 5 has arrived at the end of its stroke of attraction, a portion of its winding is cut out of circuit, while the portion of the winding which is maintained excited consumes only the necessary current to conserve the disengagement of the clutch.

The auxiliary commutator 82 serves to connect the two windings 6 and 6' either in parallel or in series, for the purpose of varying the effect of attraction acting on the core 8 according to the needs. When the two contacts 88 of this commutator, which are connected between themselves, connect the conductors 81 and 83 one to the other, the two windings 6 and 6' are connected in series, and when the two contacts 87 are closed and the contacts 88 open, the windings are connected in parallel.

Two supplementary switches 106 and 107 are connected, the first between the conductor 72 leading to the positive pole of the battery 98 and the conductor 73 leading to the relay 74, and the second between the conductor 72 and a conductor 108 which arrives at the contact 105. On the other hand, the contact 99' is connected by the conductor 109 to the conductor 78 leading to the relay 79. These switches are both connected to a single actuating member so that, when this actuating member is moved in the direction of closure, the switch 106 closes first, and when the movement of the control member continues in the same direction, the switch 107 closes a moment later. When the actuating member is moved in the direction of opening, preferably under the action of a spring, the switch 107 opens first, and the switch 106 a moment later. This single actuating member can be constituted by the same member which serves to effect the movement of the movable contact 70 of the commutator 66, and the disposition can be such that while moving the contact 70, the switch 106 can be maintained closed. When the movable contact 70 has been placed on one of the double contact pieces 68, 68' and the selector 61 has advanced for engaging the gears corresponding to the chosen speed, the circuits of the windings of the cores 5 and 8 as well as that corresponding to the winding 62, 63, 64 or 65 of the speed which has been engaged, are opened at the contacts 75 which have been separated by the abutment 86. But the maintenance of the closure of the switch 106 establishes the following circuit: Positive pole of the battery 98, conductor 72, switch 106, relay 74, conductor 103, winding 6', conductor 81, contacts 88, conductor 83, winding 6, negative pole. The windings of the core 8 are fed across the winding of the relay 74 with a current which suffices to maintain the two cores 5 and 8 in their position of attraction and to thus conserve the disengagement of the clutch. The driver of the vehicle is therefore able, by operating the control member of the commutator 66, to effect a change of speed and, following this change, maintain for any desired time the disengagement of the clutch by maintaining the control member in the position corresponding to the closure of the switch 106, the engagement being produced only when the conductor releases the operating member, which results in the opening of the switch 106 under the effect of the spring, as mentioned above, and in the rupture of the circuit of the relay 74.

The closure of the switch 107 can also be obtained by an appropriate movement of the control member of the commutator 66. This closure will be effected when for any reason one must disengage the motor when the vehicle is running and it can only be effected after the previous closure of the switch 106. Upon the closure of the switch 107 the relay 74 therefore is excited and has produced the closure of the two contacts 75. The following circuit will now be established: Positive pole of the battery 98, conductor 72, switch 107, conductor 108, contacts 105, 97 and 99', conductor 109, relay 79, conductor 77, contacts 75, conductor 104, negative pole. The relay 79 closes the switch 84 and the winding of the core 5 is excited, whereby the attraction of the core 5 and the disengagement of the clutch is produced. At the end of the movement of attraction of the core 5 the commutation device 97 controls the excitation of the core 8, as it had been described above, and the selector 61 is advanced; but since the contact 70 of the commutator 66 has not been moved, this movement of the selector has no other effect and the speed which corresponds to the position of the contact 70 remains engaged.

When for example the vehicle runs in third speed and one desires to place the change speed gear into neutral, one must move the movable contact 70 of the commutator 66 from the contact pieces 68, 68', corresponding to the position III, to the contact piece 69. In order to avoid, while effecting this control, to successively pass through the second and through the third speed, one can close the switch 107, which produces the disengagement of the motor and maintains the cores 5 and 8 in their respective positions of attraction, and then move the movable contact 70 on the contact piece 69; in this manner it is avoided to actuate the selector 61 each time when the movable contact 70 passes the contact pieces 68, 68' corresponding to the second and to the first speed, and to engage the corresponding gears.

It is seen that the circuit controlled by the switch 107 can only be closed between the contacts 99' and 105 when the core 5 of the electromagnets is in a position adjacent to its position of rest and when the movable contact 97 is at the lower end of its stroke. This avoids an unnecessary discharge of the battery when the driver, after having disengaged on a position of speed, forgets to bring the common actuating member of the switches 106 and 107 and of the commutator 66 back to median position.

In the represented example the reduction of the consumption of current is obtained by cutting a portion of the winding of the principal core 5 out of circuit. It will be naturally also possible to realize this reduction of consumption by connecting the winding of this core in series with another winding or with a resistance.

It is an essential object of the movable contact 97 to ensure a sufficient stroke for the release of the clutch before beginning the passage of the speeds, and a correct order of succession of the releasing movement and of the movement of the passage of the speeds, or of the movements of the primary core and of the secondary core.

It should be understood that the present disclosure is for the purpose of illustration only and that various changes and modifications may be made in the details of structure and in the connections of parts without departing from the spirit of the invention and which fall within the scope of the appended claims.

I claim:

1. Electromagnetic means for controlling the movement of members to be driven in a predetermined order, comprising primary and secondary coils, primary and secondary movable cores, each core being connected to one of the members to be driven, a coupling rod interconnecting the two movable cores, said coupling rod being secured to the secondary core and being movable together with and relatively to the primary core, means for simultaneously connecting in circuit both said coils, and means for maintaining excitation of the secondary coil while the primary coil is de-energized whereby said coupling rod secured to the secondary core maintains the primary core in attracted position as long as the secondary core is energized.

2. Electromagnetic means for controlling the movements of members to be driven, comprising a primary coil, a secondary coil, primary and secondary cores movable within said coils, a coupling rod secured to the secondary core and connected to the primary core for movement with the core and relative thereto, each core being operatively connected to one of the members to be driven, a mechanical movement transmission device interposed between the primary core and the member to be driven thereby and adapted to transmit the movement of the primary core with variable speed and torque, and fluid pumping means connected to said movement transmission device and acting as brake for the movement of the primary core.

3. Electromagnetic means for controlling the movements of members to be driven, comprising axially aligned primary and secondary coils, primary and secondary armature cores movable within said coils, a coupling rod axially traversing said cores and connecting the cores for movement together and relatively one with respect to the other, each core being operatively connected to one of the members to be driven, a first movement transmission lever connected to the primary core, a second transmission lever connected to the member to be driven, said two levers being provided with coacting cam surfaces adapted to vary the transmission ratio between the primary core and the member to be driven thereby, and a fluid pumping device connected to said first mentioned lever and acting to adapt the movement of attraction of the primary core to the resistances to be overcome for moving the member to be driven.

4. An electromagnetic control device comprising primary and secondary axially aligned coils, primary and secondary armature cores movable within said coils, an axially extending coupling rod for interconnecting said cores, said coupling rod being yieldingly secured to the secondary core and slidably traversing the primary core, and an abutment on said coupling rod cooperating with the primary core to hold the primary core in its attracted position as long as the secondary core is held in attracted position owing to energization of the secondary coil.

5. An electromagnetic control device comprising primary and secondary axially aligned coils, primary and secondary armature cores movable in said coils, a coupling rod secured to the secondary core and slidably traversing the primary core, an abutment carried by said coupling rod and coacting with the primary core to permit successive movement of attraction of the two cores and to hold the primary core in attracted position as long as the secondary core is held in attracted position, electric circuits connected to said coils, the secondary coil comprising two coil portions, and switching means in the circuit of the secondary coil for connecting the two coil portions in series or in parallel.

6. An electromagnetic power transmitting device comprising primary and secondary coils, primary and secondary armature cores movable in said coils, coupling means for interconnecting said cores to be movable together and relatively to each other, means for connecting each core to a member to be actuated upon energization of the coils, and mechanically operable means adapted to act on the means connecting the primary core to the member to be actuated for substituting electromagnetic operation of said member by mechanical operation.

7. An electromagnetic power transmission device for actuating two members to be driven, comprising primary and secondary coils, primary and secondary armature cores movable in said coils, means for connecting the secondary core to one of the members to be driven, a movement transmission lever connected to the primary core, a second transmission lever, a torque limiting device connected to said second lever and to the other of the members to be driven, said two levers being provided with coacting cam surfaces adapted to transmit power from said primary core with varying ratio of transmission to the member to be driven, and coupling means to interconnecting said two armature cores to be movable together and relatively to each other.

8. An electromagnetic control device comprising axially aligned primary and secondary coils, primary and secondary armature cores movable in said coils, an axially extending coupling rod connecting the two cores to be movable together and relatively one to the other, said coupling rod being secured to the secondary core and movable relatively to the primary core whereby the movement of attraction of the primary core is transmitted by the coupling rod to the secondary core and movement of attraction of the secondary core is effected relatively to the primary core, electric circuits connected to said coils, and a commutating device controlling said circuits and actuated by the movement of attraction of the two cores to close the circuit of the secondary coil when the primary core approaches the end of its stroke of attraction.

9. An electromagnetic control device comprising axially aligned primary and secondary coils, primary and secondary armature cores movable in said coils, an axially extending coupling rod connecting the two cores to be movable together and relatively one to the other, said coupling rod being secured to the secondary core and movable relatively to the primary core whereby the movement of attraction of the primary core is transmitted by the coupling rod to the secondary core and movement of attraction of the secondary core is effected relatively to the primary core, electric circuits connected to said coils, and a commutating device controlling said circuits and actuated by the movement of attraction of the two cores to close the circuit of the secondary coil when the primary core approaches the end of its stroke of attraction, and to reduce the consumption of current of the primary coil upon completion of the stroke of attraction of the primary core.

10. Electromagnetic means for controlling two members to be driven comprising primary and secondary axially aligned coils, primary and secondary armature cores within said coils, coupling means operatively connecting the two cores whereby the movement of attraction of the primary core is transmitted to the secondary core and movement of attraction of the secondary core is effected relatively to the primary core, electric circuits connected to said coils, a commutating device controlling said circuits, means for connecting the primary core to one of the members to be driven, means for connecting the secondary core to the other member to be driven, means movable with said second mentioned member to be driven for cutting said circuits upon completion of the stroke of attraction of the secondary core, an electric circuit for bridging the point of rupture of the circuits of the two coils, a switch in said electric circuit, said switch upon being closed at the end of the stroke of attraction of the secondary coil permitting a feeble current to pass through the secondary coil to maintain the coil excited whereby the secondary core maintains the primary core in its position of attraction by the intermediary of said coupling means.

11. Electromagnet means for controlling two members to be driven comprising primary and secondary axially aligned coils, primary and secondary armature cores within said coils, coupling means operatively connecting the two cores whereby the movement of attraction of the primary core is transmitted to the secondary core and movement of attraction of the secondary core is effected relatively to the primary core, electric circuits connected to said coils, a commutating device controlling said circuits, means for connecting the primary core to one of the members to be driven, means for connecting the secondary core to the other member to be driven, means movable with said second mentioned member to be driven for cutting said circuits upon completion of the stroke of attraction of the secondary core, an electric circuit for bridging the point of rupture of the circuits of the two coils, a switch in said electric circuit, said switch upon being closed at the end of the stroke of attraction of the secondary core permitting a feeble current to pass through the secondary coil to maintain the coil excited whereby the secondary core maintains the primary core in its position of attraction by the intermediary of said coupling means, a second switch operatively connected to said first mentioned switch to be closed after closure of said first mentioned switch and to be opened before the opening of the first mentioned switch, and a circuit controlled by said second mentioned switch, and by said commutating device and adapted to energize the circuit of the primary coil when the second mentioned switch is closed and the secondary core is in its position of rest.

12. Electromagnet means for controlling the movements of members to be driven, comprising a plurality of axially aligned coils, a movable core coacting with each of said coils, means for operatively connecting the cores so as to be movable together and relatively to each other, each core being operatively connected to one of the members to be driven, a mechanical movement transmission device interposed between one of the cores and the member to be driven thereby and adapted to transmit the movement of said core with predetermined speed and torque, and braking means connected to said movement transmission device and controlling the movement of said core.

13. Electromagnetic means for controlling the movements of members to be driven, comprising an electromagnet, two axially spaced movable cores, each core being operatively connected to one of the members to be driven, a coupling rod operatively connecting the two cores, said coupling rod being movable relatively to the first core and connected for movement with the second core, an abutment on said rod coacting with the first core and acting to maintain the first core in attracted position as long as the second core is in its position of attraction, coacting cam levers interconnected between the first core and the member to be driven thereby, said abutment on the coupling rod bearing on one of the cam levers, and fluid-operated braking means connected to the other cam lever to control the movement of said first core.

14. Electromagnetic means for controlling the movements of members to be driven, comprising an electromagnet, primary and secondary movable armature cores, coupling means interconnecting the two cores to be movable together and relatively to each other, each core being operatively connected to one of the members to be driven, a mechanical movement transmission device interposed between the primary core and the member to be driven thereby and adapted to transmit the movement of the primary core with variable torque, and a movement retarding device connected to said transmission device and acting to control the movement of the primary core, the action of said retarding device depending on the direction of movement of the primary core.

15. An electromagnetic power transmission device comprising an electromagnet, two axially spaced movable armature cores, coupling means interconnecting the two cores so as to be movable together and relatively to each other, means for connecting each core to a member to be actuated upon energization of the electromagnet, and mechanically operable means adapted to act on the means connecting one of the cores to the member to be driven thereby and on said coupling means for substituting electromagnetic operation of the members to be actuated by mechanical operation.

ERNEST ALPHONSE DERUNGS.